(12) United States Patent
Fukami et al.

(10) Patent No.: US 8,468,850 B2
(45) Date of Patent: Jun. 25, 2013

(54) BENDING METHOD FOR A GLASS PLATE AND BENDING APPARATUS FOR A GLASS PLATE

(75) Inventors: Masao Fukami, Tokyo (JP); Taisei Mori, Tokyo (JP); Yutaka Kitajima, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/792,868

(22) Filed: Jun. 3, 2010

(65) Prior Publication Data

US 2010/0236290 A1    Sep. 23, 2010

Related U.S. Application Data

(63) Continuation of application No. PCT/JP2008/071984, filed on Dec. 3, 2008.

(30) Foreign Application Priority Data

Dec. 4, 2007   (JP) ................................ 2007-313558

(51) Int. Cl.
*C03B 23/027* (2006.01)
*C03B 23/03* (2006.01)
*C03B 23/025* (2006.01)

(52) U.S. Cl.
CPC ........... *C03B 23/027* (2013.01); *C03B 23/0256* (2013.01); *C03B 23/0305* (2013.01)
USPC ............................................ 65/106; 65/290

(58) Field of Classification Search
CPC .. C03B 23/0256; C03B 23/027; C03B 23/0305
USPC ........................................................... 65/106, 290
See application file for complete search history.

(56) References Cited

U.S. PATENT DOCUMENTS

| | | | |
|---|---|---|---|
| 5,330,550 A | 7/1994 | Kuster et al. | |
| 5,849,057 A * | 12/1998 | Didelot | ............... 65/106 |
| 7,401,476 B2 | 7/2008 | Fukami et al. | |
| 2004/0107729 A1 | 6/2004 | Fukami et al. | |
| 2004/0236447 A1 | 11/2004 | Matsushita et al. | |
| 2005/0138967 A1 | 6/2005 | Hori et al. | |
| 2007/0144211 A1 | 6/2007 | Hori et al. | |
| 2008/0000267 A1 | 1/2008 | Fukami et al. | |
| 2009/0084138 A1 | 4/2009 | Imaichi et al. | |
| 2009/0320523 A1 | 12/2009 | Fukami et al. | |

FOREIGN PATENT DOCUMENTS

| | | |
|---|---|---|
| EP | 2 128 099 A1 | 12/2009 |
| JP | 2003-335533 | 11/2003 |
| JP | 2003-335534 | 11/2003 |
| JP | 2005-206458 | 8/2005 |
| WO | WO 2004/103922 A1 | 12/2004 |
| WO | WO 2008/075694 A1 | 6/2008 |

OTHER PUBLICATIONS

Supplementary Search Report issued Dec. 27, 2010, in European Patent Application No. 08857029.6-1218/2233444.

* cited by examiner

*Primary Examiner* — Christina Johnson
*Assistant Examiner* — Cynthia Szewczyk
(74) *Attorney, Agent, or Firm* — Oblon, Spivak, McClelland, Maier & Neustadt, L.L.P.

(57) ABSTRACT

In a preliminary forming step, positioning of a glass sheet is facilitated, and generation of a hinge mark by a flapping mechanism and generation of excessively bent portions, are prevented at the same time.

13 Claims, 12 Drawing Sheets

B-B cross section

C'-C' cross section

C-C cross section

D'-D' cross section

D-D cross section

BENDING METHOD FOR A GLASS PLATE AND BENDING APPARATUS FOR A GLASS PLATE

TECHNICAL FIELD

The present invention relates to a bending method for a glass sheet and an apparatus therefore, in particular, to a bending method for a glass sheet and an apparatus therefor, which are suitable for bending a glass sheet heated to a temperature in the vicinity of the softening point into an optional complexly curved shape.

BACKGROUND ART

In recent years, along with change of design of window glasses for automobiles, ones having various shapes and curvatures are demanded. For example, in a case of rear glass, a curved glass having a complexly curved shape or a deeply curved shape having a vertical cross section of substantially J shape or S shape having a larger deformation amount that is concentrated on a partial region of the glass, is demanded.

Heretofore, as a bending method for this type of glass sheet, a bending method for a glass sheet and an apparatus therefore are proposed, wherein a heated and softened glass sheet is preliminary formed, and the preliminary formed glass sheet is subjected to a main forming to form the glass sheet into a final bent shape (for example, Patent Document 1).

The bending method and apparatus for a glass sheet of Patent Document 1 will be described with reference to FIG. 14. FIG. 14 is a view for explaining the construction of an apparatus for carrying out a conventional bending method for a glass sheet.

This apparatus has a flat mold 35', a preliminary forming supporting frame 64' (it is also referred to as preliminary forming ring), a preliminary forming mold 72', a main forming supporting frame 84' (it is also referred to as main forming ring) and a main forming mold 88', etc.

The flat mold 35' sucks and holds a heated and softened glass sheet G, moves the glass sheet G to a predetermined position and releases the suction-holding. By this operation, the heated and softened glass sheet G is transferred onto a preliminary forming supporting frame 64' located at the predetermined position.

Next, the preliminary forming supporting frame 64' on which the glass sheet G is placed, moves to a position right under the preliminary forming mold 72'.

Next, the glass sheet G placed on the preliminary forming supporting frame 64' is preliminarily formed (press-formed) by the preliminary forming mold 72' movable downwardly by an elevating mechanism (not shown). Namely, the glass sheet G is formed into a more gently curved shape (20 to 80% of the deformation amount from a flat-shaped glass sheet into a final shape) than a final bent shape.

Next, the preliminary formed glass sheet is placed on the main forming supporting frame 84'. The main forming supporting frame 84' on which the glass sheet is placed moves to a position right under the main forming mold 88'.

Next, the glass sheet G placed on the main forming supporting frame 84' is pressed against the main forming mold 88' movable downwardly by an elevating mechanism (not shown) thereby to form the glass sheet G into a final bent shape (main forming).

As described above, by the bending method for a glass sheet described in Patent Document 1, since a preliminary bending is carried out by using a preliminary forming supporting frame and a preliminary forming mold in advance to a main forming, it is possible to realize production of a glass sheet G having an optically high quality, that has been difficult to produce by conventional technique, and having a complexly and deeply curved shape, with high productivity.

Patent Document 1: JP-A-2005-206458

DISCLOSURE OF THE INVENTION

Problems to be Solved by the Invention

In the apparatus described in Patent Document 1, when the final shape is a deeply curved shape, the following two problems occur.

First, a first problem will be described. When the final shape is a deeply curved shape, a glass sheet is bent into a shape close to the final shape even in the preliminary forming step, and a preliminary forming supporting frame (it is also referred to as a ring) having a deeply curved shape corresponding to the deeply curved shape of the glass sheet, is required. However, it is difficult to place a flat glass sheet on a glass-plate-placing face of a preliminary forming supporting frame having a deeply curved shape, with a proper posture. For this reason, a position of the glass sheet placed on the preliminary forming supporting frame tends deviate and the forming accuracy of the glass sheet tends to vary. Further, since the glass sheet does not make a surface contact but makes a corner contact to the preliminary forming supporting frame, the glass sheet tends to be cracked by a shock of drop at a time of placing the glass sheet. This is a first problem occurring at the time of placing a glass sheet on the preliminary forming supporting frame. Further, in a case of locally deeply bending a glass sheet, it is known to use a forming ring having a flapping mechanism.

However, if this forming ring having a flapping mechanism is employed as a preliminary forming supporting frame, when a glass sheet is moved onto the forming ring having a flapping mechanism, the glass sheet may contact a hinge portion of the forming ring having a flapping mechanism, to cause a mark of hinge on the glass sheet.

Next, a second problem will be described. When a final shape is a deeply curved shape or a complexly curved shape (for example, a shape required to bend in a plurality of directions), wrinkles may be formed on a surface of a glass sheet unless forming is carried out efficiently. For this reason, a certain degree of deep bending is required even in the preliminary forming step. Further, it is necessary to bend the glass sheet to a certain degree (a degree to prevent positioning error) in the preliminary forming step so as to prevent position error of the glass sheet at a time of transferring glass sheet onto the main forming supporting frame.

However, if a deep bending of a glass sheet is attempted in the preliminary forming step, a portion, that is not desired to be bent, may be deeply bent or wrinkles may be formed. For this reason, a shape obtainable by the preliminary forming step has been limited (here, slow bending such as bending by gravity may extend the formable range, but the productivity decreases significantly). As a result, a formable range at a time of two-stage press-forming of a glass sheet is also limited. This is a second problem with respect to limitation of formable range.

In order to solve the above first problem, it is considered to provide a double ring (a receiving ring (inner mold) and a forming ring (outer mold)), position and place a flat glass sheet on the receiving ring (inner mold) and transfer the glass sheet from the receiving ring (inner mold) onto the forming ring (outer mold) thereby to solve the problem.

In order to solve the above second problem, it is considered to provide a mold so as to correspond to a portion that tends to be bent excessively, and receive the glass sheet by this mold thereby to solve the problem.

However, since the position to dispose the mold partially overlaps the disposed position of the receiving ring (inner mold), when the double ring (a receiving ring (inner mold) and a forming ring (outer mold)) is provided to solve the above first problem, there is no space for disposing the mold in the disposed position of the receiving ring (inner mold), and it may not possible to press by the mold all portions that tends to be bent excessively.

Namely, in a case of carrying out a deep bending of a glass sheet by two-stage press, it is effective to use a double ring (a receiving ring (inner mold) and a forming ring (outer mold)) to solve the above first problem, but when such a double ring is provided, a new problem that the above second problem cannot be solved, occurs.

The present invention has been made under these circumstances, and it is an object of the present invention to provide a bending method for a glass sheet and an apparatus therefore, which can solve the above first problem by easily positioning a flat glass sheet on the preliminary forming supporting frame and preventing damage of the glass sheet at a time of placing the glass sheet on the preliminary supporting frame, and at the same time, the above second problem of causing a portion of a glass sheet that tends to be bent excessively at a time of deeply bending the glass sheet.

Means to Solve the Problems

In order to achieve the above objects, the present invention provides a bending method for a glass sheet comprising:

a preliminary forming step of placing a heated and softened glass sheet on a preliminary forming supporting mold which supports edge portions of the glass sheet, and pressing the glass sheet against a forming face of the preliminary forming supporting mold in a state that the glass sheet is placed on the preliminary forming supporting mold to form the glass sheet into a desired preliminary bent shape; and a main forming step of transferring the glass sheet formed into the preliminary bent shape onto a main forming supporting mold which supports edge portions of the glass sheet, and pressing the glass sheet against a forming face of a main forming mold in a state that the glass sheet is placed on the main forming supporting mold to form the glass sheet into a desired final bent shape;

wherein the preliminary forming supporting mold comprises an outer mold and an inner mold provided inside the outer mold and having a flatter glass-plate-placing face than that of the outer mold, the main forming supporting mold comprises a lower mold having a forming face opposed to the main forming mold;

the preliminary forming step includes a step of transferring the heated and softened glass sheet onto the inner mold, a step of transferring the glass sheet on the inner mold onto the outer mold, a step of pressing the glass sheet placed on the outer mold against the forming face of the preliminary forming mold, and a step of holding the glass sheet formed into the preliminary bent shape by the preliminary forming mold; and the main forming step includes a step of transferring the glass sheet formed into the preliminary bent shape onto the main forming supporting mold, and a step of pressing the glass sheet against the forming face of the main forming mold while an under surface of the glass sheet is supported by the forming face of the lower mold while the glass sheet is placed on the main forming supporting mold.

In the present invention, a preliminary forming supporting mold having an outer mold and an inner mold disposed inside the outer mold and having a flatter glass-plate-placing face than that of the outer mold, is employed, and a heated and softened glass sheet is placed on the inner mold first, and then, the glass sheet on the inner mold is transferred from the inner mold onto the outer mold, whereby it is possible to easily position the glass sheet placed on the outer mold as compared with a case of directly placing the glass sheet on the outer mold.

Further, since the glass sheet is bent on the outer mold to a certain extent by its own weight, it is possible to avoid contact of corners of the glass sheet to the outer mold at a time of placing the glass sheet on the outer mold, and to prevent damages of the glass sheet since shock of drop is reduced.

Further, since the main forming supporting mold includes a lower mold having a forming face opposed to the main forming mold, and the glass sheet is pressed against a forming face of the main forming mold while the under surface of the glass sheet is supported by the forming face of the lower mold in a state that the glass sheet is placed on the main forming supporting mold, it is possible to press or press back a portion of the glass sheet that tends to be bent excessively in the preliminary forming step. Further, this feature also provides an effect of pressing the glass sheet to prevent generation of a portion that tends to be bent excessively in the bending of the main forming step.

Namely, by the present invention, it is possible to solve the above first problem by easily positioning a flat glass sheet onto a preliminary forming supporting mold in the preliminary forming step, and to prevent damages of a glass sheet at a time of placing the glass sheet on the preliminary forming supporting mold, and at the same time, the above second problem of causing a portion that tends to be bent excessively at a time of deeply bending the glass sheet.

In the present invention, in order to solve the above first problem, a preliminary forming supporting mold having an inner mold and an outer mold is provided for a first stage, and a glass sheet is formed so as to allow generation of a portion that is bent excessively in the preliminary forming step. Then, in the second stage, a lower mold is disposed so as to correspond to the portion that is bent excessively. By this construction, it is possible to press back the excessively bent portion by the lower mold provided for the second stage, and to prevent excessive bending of the glass sheet in the next press.

Further, in conventional forming methods, the formable shape is limited, but in the present invention, it is possible to form a shape that is not formable by conventional two-stage press or one-stage press. Namely, in a forming of a glass sheet into a deeply curved shape by a known supporting frame having an inner mold and an outer mold in a one-stage press, there is no space for disposing a mold at the disposed position of the inner mold, and it is difficult to form a shape that requires pressing by the mold.

Further, in a known two-stage press, a female mold is disposed instead of the preliminary forming supporting frame in some cases. However, in a case of forming a deeply curved shape, since the position of a glass sheet placed on the female mold is critical, a deeply curved shape obtainable by a preliminary forming has been limited to a shape that can be accurately placed on the female mold. Since a final bent shape tends to depend on the preliminary bent shape, the range of formable shape is limited even in the case of deeply curved shape.

However, in the present invention, the main forming supporting mold includes a lower mold having a forming face opposed to the main forming mold, and in the main forming step, a glass sheet is pressed against a forming face of the main forming mold while the under surface of the glass sheet is supported by a forming face of the lower mold in a state that the glass sheet is placed on the main forming supporting mold. Accordingly, it is possible to improve the degree of freedom of the preliminary forming step even in a case of carrying out a forming into a deeply curved shape by using the preliminary forming supporting mold having an inner mold and an outer mold. Further, it is also possible to form a shape that has been difficult to position on the female mold. Here, the final bent shape in the present invention means a shape after completion of the main forming step, and it is allowable to deform the glass sheet after the main forming step by its own weight and deformation by cooling after the main forming step.

Further, in an embodiment of the present invention, it is preferred that the final bent shape has curvatures in at least two directions, and the preliminary forming step is a step of bending the glass sheet at least in the direction having larger curvature in the final bent shape, to preliminarily form the glass sheet into the preliminary bent shape.

Namely, the preliminary bent shape becomes a shape wherein an outline portion along a direction having a large curvature of preliminary bending substantially agrees with a corresponding outline portion of the final bent shape in plan view.

By this construction, since the shape of the glass sheet after the preliminary forming becomes a shape that can be easily placed on the main forming supporting mold with a proper posture, it is possible to suppress the position error of the glass sheet after the preliminary forming, placed on the main forming supporting mold.

For example, when the final bent shape is a shape of so-called deep wing, that is deeply curved in one direction, by deeply bending the glass sheet in the direction in the first stage in the preliminary forming step, it is possible to make the outline along the direction corresponding to the bent direction in the plan view becomes substantially the same as the outline of the final bent shape. Bending in other directions is carried out in the second stage. By such a forming method, it is also possible to prevent formation of e.g. wrinkles in a portion of the glass sheet that is deeply bent.

Further, in an embodiment of the present invention, it is preferred that the preliminary forming step is a step of bending the glass sheet into a shape substantially agrees with an outline of the final bent shape in plan view, to preliminary form the glass sheet into the preliminary bent shape.

Namely, the preliminary bent shape becomes a shape having an outline substantially agrees with the outline of the final bent shape in plan view, but the face of the glass sheet in side view is more gently bent than that of the final bent shape.

Accordingly, since the shape of the glass sheet after the preliminary forming becomes a shape that is easily placed on the main forming supporting mold with a proper posture, it becomes possible to suppress position error of the glass sheet after the preliminary forming, placed on the main forming supporting mold. For example, in a case of forming a glass sheet into a so-called egg that is an entirely deeply curved shape as the final bent shape, in the preliminary forming step, the peripheral portion of the glass sheet is formed so that the outline of the glass sheet after the preliminary forming becomes substantially the same as the outline of the main forming supporting mold in the first stage, and a deep bending in the central portion is carried out in the second stage. By such a forming method, it is also possible to prevent formation of wrinkles.

Further, in an embodiment of the present invention, it is preferred that the outer mold of the preliminary forming supporting mold has a flapping mechanism comprising a fixed frame and one or more movable frames connected to respective ends of the fixed frame so as to be swingable, and the preliminary forming step includes a step of flapping the glass sheet placed on the outer mold by the movable frames.

In a case of deeply bending a glass sheet, wrinkles may be formed if the glass sheet is bent at one time. However, by employing a flapping mechanism and bending the glass sheet slowly and deeply thereby achieving an effective preliminary forming, it is possible to prevent generation of wrinkles. Further, since the glass sheet on the inner mold is transferred onto the outer mold in the present invention, even if an outer mold having a flapping mechanism is employed as the outer mold, it is possible to prevent formation of a hinge mark on the glass sheet due to the flapping mechanism of the outer mold having the flapping mechanism, as compared with a case of directly placing the glass sheet on the outer mold.

Further, in an embodiment of the present invention, it is preferred that the forming face of the lower mold has a plurality of holes communicated with an air suction means, and the main forming step includes a step of promoting forming of the glass sheet by suction of air through the plurality of holes by means of the air suction means.

Thus, by providing a suction means in the lower mold, it is possible to suck a glass sheet during conveyance, and to bend the glass sheet further slowly and deeply thereby to extend the range of formable shape.

Meanwhile, the present invention provides a bending apparatus for a glass sheet comprising a preliminary forming supporting mold for supporting edges of a heated and softened glass sheet, a preliminary forming mold for press-molding the glass sheet, that is placed on the preliminary forming supporting mold, into a desired preliminary bent shape, a main forming supporting mold for supporting edges of the glass sheet formed into the preliminary bent shape, and a main forming mold for press-forming the glass sheet that is placed on the main forming supporting mold, into a desired final bent shape; wherein the preliminary forming supporting mold has an outer mold and an inner mold disposed inside the outer mold and having a flatter glass-placing face than that of the outer mold, and a transferring means for transferring the glass sheet from the inner mold onto the outer mold, and the main forming supporting mold has a lower mold having a forming face opposed to the main forming mold.

In the present invention, since an inner mold having a flatter glass-placing face than the outer mold is disposed inside the outer mold in the preliminary forming supporting mold, it becomes possible to transfer a heated and softened glass sheet onto the inner mold, and subsequently to transfer the glass sheet from the inner mold onto the outer mold. For example, the outer mold is a ring-shaped frame and the inner mold is a ring-shaped frame having a substantially flat face for placing a glass sheet. Further, for example, the preliminary forming supporting mold may be a preliminary lower mold that is divided into a central portion functioning as the inner mold and a peripheral portion functioning as the outer mold.

Further, since a lower mold having a forming face opposed to the main forming mold is provided inside the main forming supporting mold, it is possible to press a glass sheet against a forming face of the main forming mold while an undersurface of the glass sheet is supported by the forming face of the lower mold in a state that the glass sheet is placed on the main forming supporting mold. For example, the main forming supporting mold may have a supporting frame and a lower mold that are separated from each other, or that are integrally formed.

Further, in an embodiment of the present invention, it is preferred that the main forming supporting mold has a shape that substantially agrees with the peripheral shape of the final bent shape having curvatures in at least two directions, and at least two opposing sides of the outline of the outer mold of the preliminary forming supporting mold in plan view substantially agree with at least two opposing sides of the outline of the main forming supporting mold in plan view corresponding to the opposing two sides of the outline of the outer mold of the preliminary forming supporting mold.

By this construction, even if a final bent shape has curvatures in at least two directions, it is possible to form a glass sheet in the preliminary forming into a shape whereby the glass sheet after the preliminary forming can be easily placed on the main forming supporting mold with a proper posture.

Further, in an embodiment of the present invention, it is preferred that the outline of the outer mold of the preliminary forming supporting mold in plan view substantially agrees with the outline of the main forming supporting mold in plan view.

By this construction, even if the final bent shape is an entirely deeply curved shape (egg shape), it is possible to form a glass sheet in the preliminary forming into a shape that can be easily placed on the main forming supporting mold with a proper posture.

Further, in an embodiment of the present invention, it is preferred that the outer mold of the preliminary forming supporting mold has a flapping mechanism comprising a fixed frame and one or more movable frames connected to respective ends of the fixed frame so as to be swingable.

By such a flapping mechanism, it becomes possible to bend a glass sheet slowly and deeply to achieve an efficient preliminary forming.

Further, in an embodiment of the present invention, it is preferred that the lower mold has an air-suction means and a forming face having a plurality of holes communicated with the air-suction means.

By thus providing an air suction means in the lower mold, it becomes possible to achieve forming by vacuum during conveyance.

Effects of the Invention

As described above, by the present invention, it is possible to produce with high quality and high productivity a glass sheet having a deeply curved shape that has been difficult by conventional methods, such as a glass sheet having a deep-wing shape that is deeply curved in one direction or a so-called egg shape that is entirely deeply curved toward the inside of the glass sheet.

EXPLANATION OF NUMERALS

10: heating furnace, 20: forming furnace, 30: air cooling tempering apparatus, 40: roller conveyer for conveying out, 60: preliminary forming apparatus, 62: main forming apparatus, 100: bending apparatus for a glass sheet, 200: lower forming apparatus for preliminary forming, 500: lower forming apparatus for main forming, 230: inner mold having a flapping mechanism, 237: inner mold fixed frame, 238: inner mold hinge portion, 239: inner mold movable frame, 240: forming ring having a flapping mechanism, 242: fixed frame, 243: hinge portion, 244: movable frame, 300: upper forming apparatus for preliminary forming, 600: upper forming apparatus for main forming, 302: preliminary forming mold, 418, 718: moving roller, 520: lower mold, 540: main forming supporting mold, 602: main forming mold, M1: servo motor, G: glass sheet

BEST MODE FOR CARRYING OUT THE INVENTION

A bending apparatus 100 for a glass sheet as an embodiment of the present invention, and a bending method for a glass sheet G employing the apparatus, are described with reference to drawings.

[Detail of Bending Apparatus 100 for a Glass Sheet]

Figure 1:
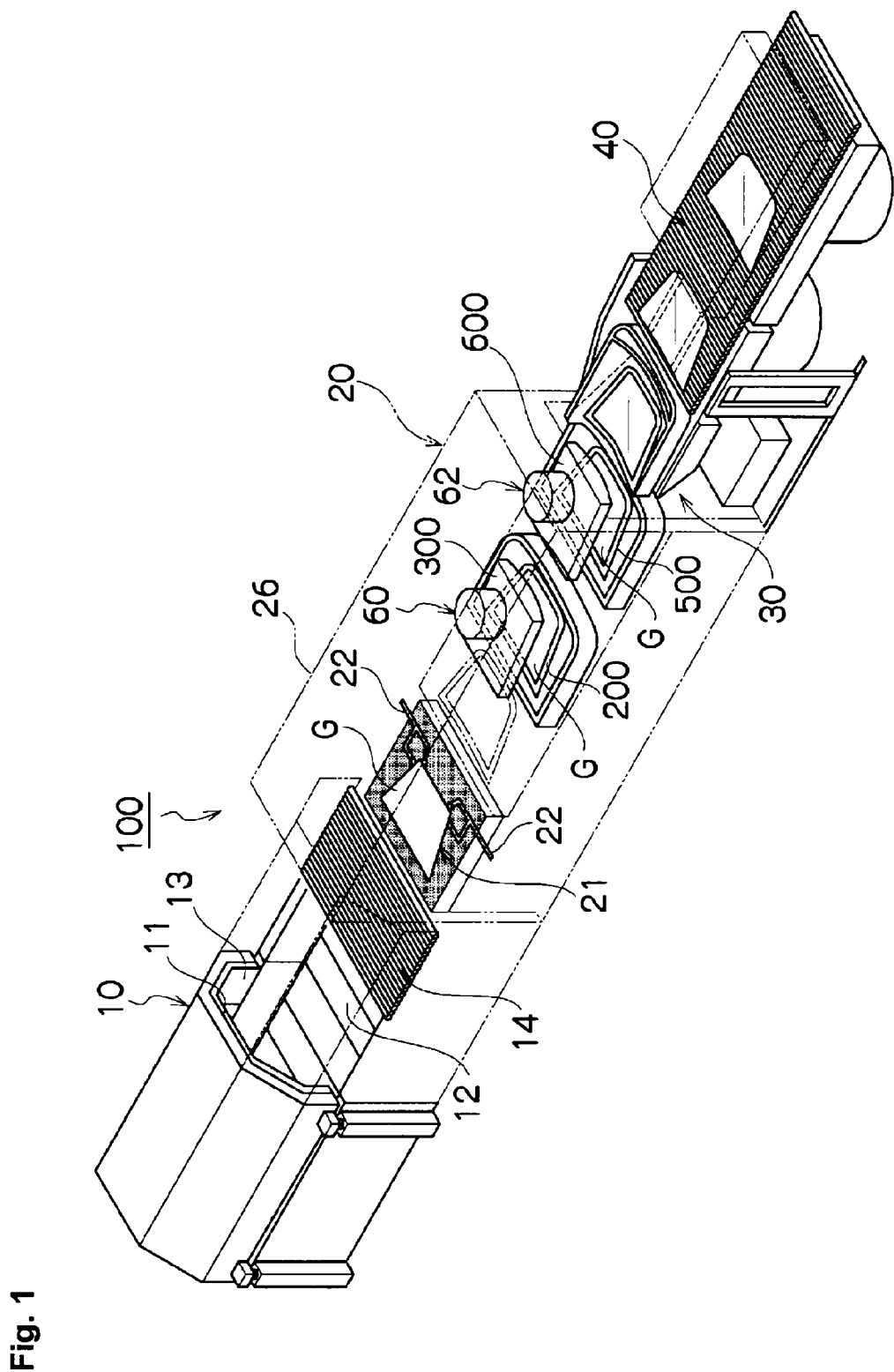
FIG. 1: A perspective view, that is a partially X-ray view, showing a bending apparatus for a glass sheet as an embodiment of the present invention.
Figure 2:
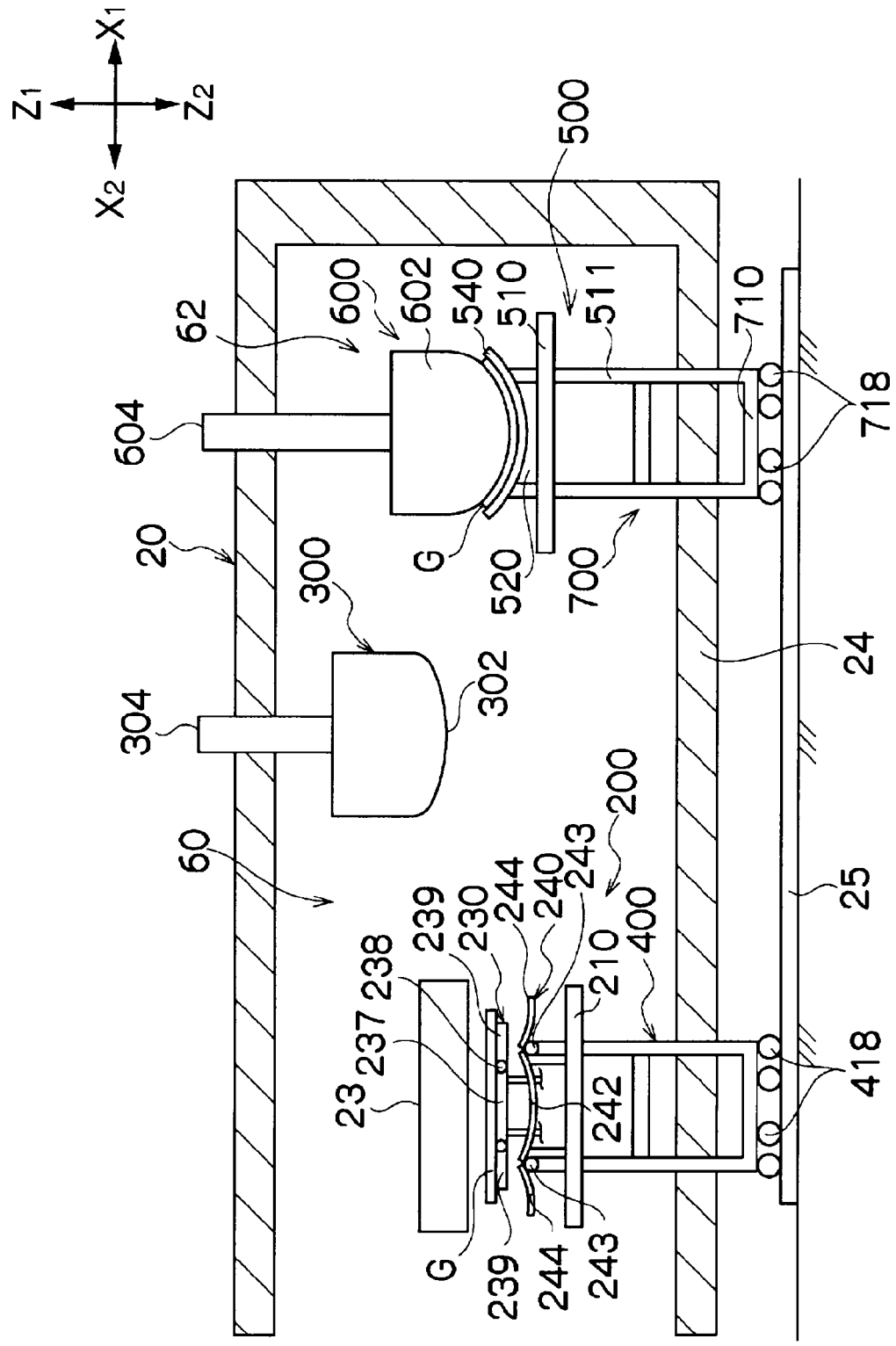
FIG. 2: A side view schematically showing the structure of the bending apparatus shown in FIG. 1.

FIGS. 1 and 2 are views for explaining the construction of a bending apparatus for a glass sheet of this embodiment.

A bending apparatus 100 for a glass sheet G is basically constituted by a heating furnace 10 (corresponding to the heating means of the present invention), a forming furnace 20, an air cooling-tempering apparatus 30 and a roller conveyer 40 for conveying out, in this order from the upstream side of the conveying line of a glass sheet G.

The heating furnace 10 is an electric heating furnace having furnace walls made of e.g. refractory bricks, and sealing heaters 11, furnace floor heaters 12 and side wall heaters 13 provided on the inner wall surface of the furnace walls. Further, above the furnace floor in the heating furnace 10, a roller conveyer 14 constituted by a plurality of heat-resistant silica rollers, is disposed, whereby a glass sheet G conveyed on the roller conveyer is heated to a desired bendable temperature (650 to 720° C.) by the above heaters.

On the downstream side of the heating furnace 10, a forming furnace 20 being an electric heating furnace similar to the heating furnace 10, is disposed, and just after its entrance for a glass sheet G, a hearth bed 21 for supporting a conveyed glass sheet G by air-floating, is disposed. Here, the heating furnace 10 is not limited to an electric furnace, but it may be a gas heating furnace.

The hearth bed 21 has a plurality of holes (not shown) perforating a placing face for a glass sheet G, and is configured to blow heated air from these holes to float and support the glass sheet G. On the downstream side of the hearth bed 21, a pair of positioners 22 are disposed for positioning the glass sheet G supported by the air-floating.

Further, above the hearth bed 21, a flat mold 23 movable horizontally in X direction and its reverse direction, is disposed. The flat mold 23 is a surface plate having a size equivalent to or larger than the size of the glass sheet G, and it has a large number of air suction/blowing holes densely perforating through its flat undersurface.

In a lower portion of the flat mold 23, an air intake port communicating with these air suction/blowing holes is formed, and a blower and an air-suction means are connected to this air intake port via a dumper outside the furnace (they are not shown). By controlling suction/blowing of air for each of the air suction/blowing holes, it is possible to support the glass sheet G by non-contact manner. In the forming furnace 20, a preliminary forming apparatus 60 and a main forming apparatus 62 are disposed.

[Preliminary Forming Apparatus 60]

The preliminary forming apparatus 60 is an apparatus for carrying out a preliminary forming to a glass sheet G transferred from the flat mold 23, and the preliminary forming apparatus 60 has a lower forming apparatus 200 for preliminary forming and an upper forming apparatus 300 for preliminary forming.

As shown in FIG. 2, the lower forming apparatus 200 for preliminary forming has a preliminary forming supporting mold as a lower mold for placing a glass sheet G, and the preliminary forming supporting mold has an inner mold 230 having a flapping mechanism and an outer mold 240 having a flapping mechanism (it is also referred to as forming ring having a flapping mechanism) disposed around the inner mold 230 having a flapping mechanism.

This lower forming apparatus 200 for preliminary forming is mounted on a table 210 having moving rollers 418 rolling on a rail 25 disposed under the floor, and the moving rollers 418 are each configured to be driven by a servo motor (not shown), whereby the apparatus itself moves as it is guided by the rail 25.

Figure 3:
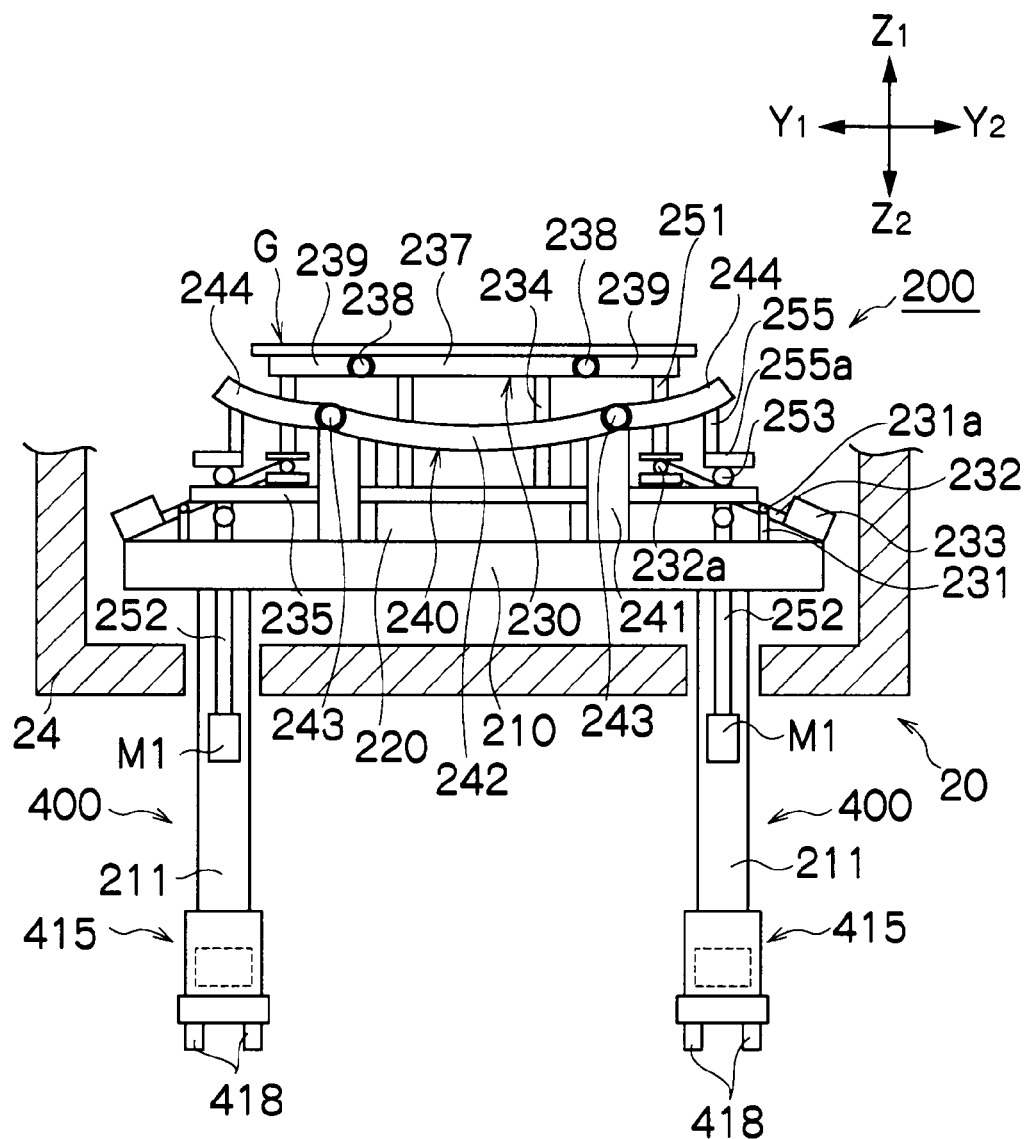
FIG. 3: A side view showing the detail of a lower forming apparatus 200 for preliminary forming.
Figure 4:
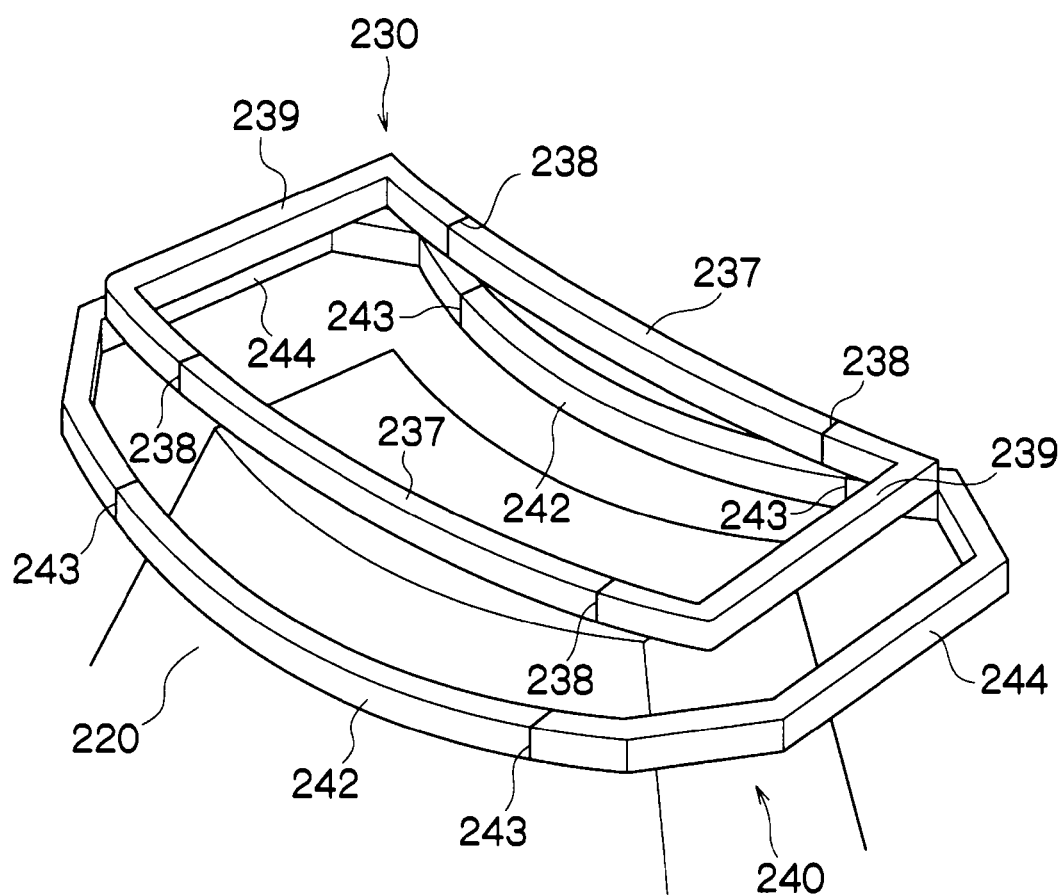
FIG. 4: A view for explaining an inner fixed frame 237 and an inner movable frame 239.

As shown in FIGS. 3 and 4, the inner mold 230 having a flapping mechanism has a ring-shaped construction constituted by an inner mold fixed frame 237 and an inner mold movable frames 239 connected to respective ends of the inner mold fixed frame 237 via hinge portions 238. Here, the size of the inner mold 230 having a flapping mechanism is slightly smaller than the outer dimension of the glass sheet G before bending, so that the inner mold 230 having a flapping mechanism is configured to support a slightly inside portion the glass sheet G from its periphery.

A base plate 235 is connected to a movable rod 252 movable up and down in the vertical direction by a servo motor M1, whereby the base plate is movable up and down according to the up-down movement of the movable rod 252. The inner mold fixed frame 237 is fixed to the base plate 235 by a supporting frame 234, whereby the inner mold fixed frame is moved up and down together with the base plate 235 according to the up-down movement of the movable rod 252. Meanwhile, the inner mold movable frames 239 are each connected with the table 210 via a rod 251 and a pole 232 rotatably supported around a hinge portion 231a provided on the table 210.

Accordingly, the inner mold movable frames 239 are each swung with respect to the inner mold fixed frame 237 about a hinge portion 238 according to up-down movement of the base plate 235 and the inner mold movable frame 237. This swing movement of the inner mold movable frames 239 is referred to as flapping.

Figure 5:
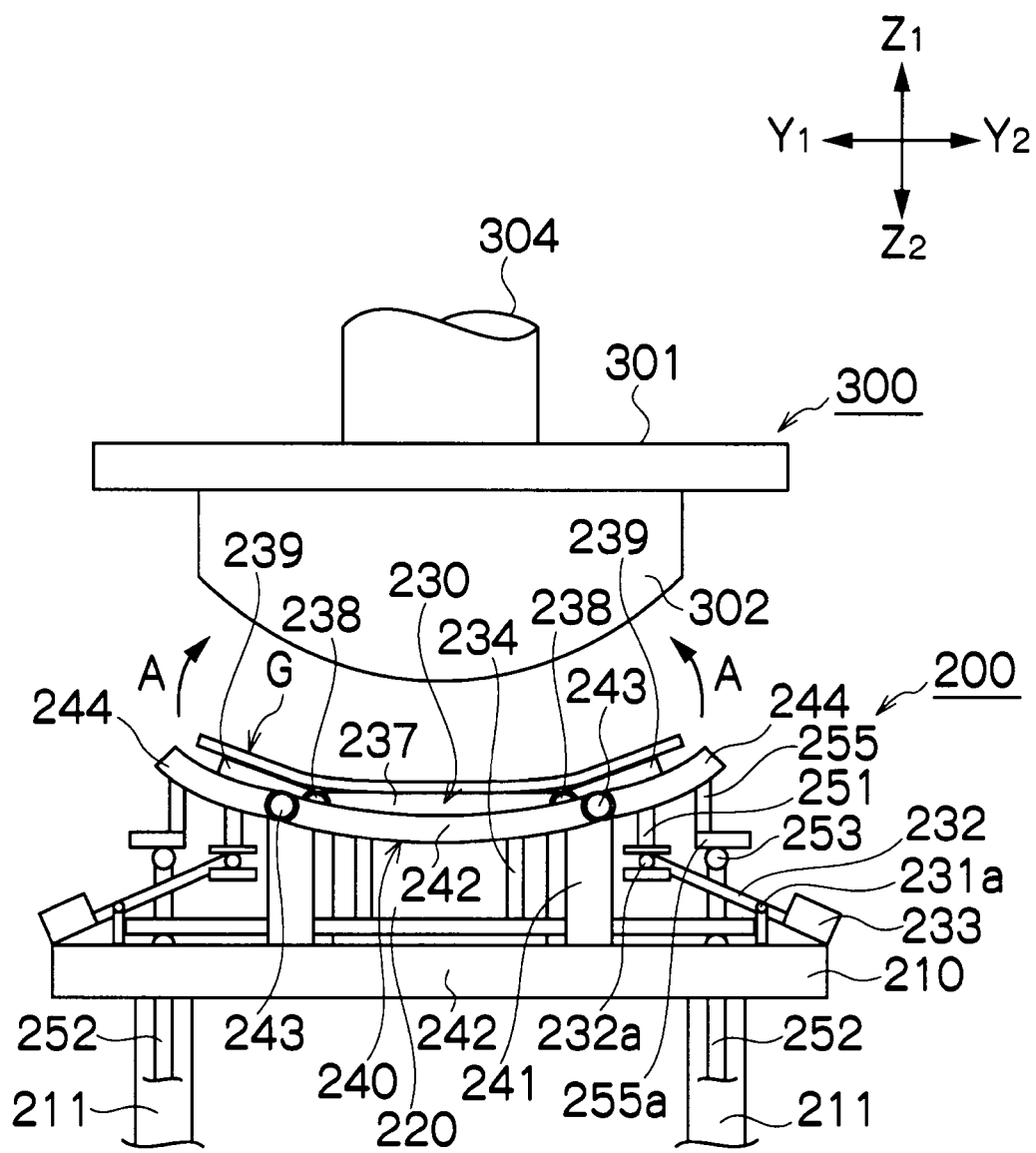
FIG. 5: A side view for explaining transferring of a glass sheet from an inner mold onto an outer mold.

When the base plate 235 and the inner mold fixed frame 237 are moved up, the inner mold fixed frame 237 and the inner mold movable frames 239 are in a state of substantially flat, whereby their positions are at positions higher than a fixed frame 242 and movable frames 244 of a forming ring 240 having a flapping mechanism to be described later (refer to FIG. 3). On the other hand, when the base plate 235 and the inner mold fixed frame 237 are moved down, the inner mold movable frames 239 are each swung with respect to the inner mold fixed frame 237 about a hinge portion 238, whereby the inner mold fixed frame 237 and the inner mold movable frames 239 are at positions lower than the fixed frame 242 and the movable frames 244 of the forming ring 240 having a flapping mechanism to be described later. Namely, when the base plate 235 and the inner mold fixed frame 237 are moved down, as shown in FIG. 5, while a glass sheet placed on the inner mold 230 having a flapping mechanism is flapped by the inner mold movable frames 239, the inner mold 230 having a flapping mechanism gradually approaches to the outer mold 240 having a flapping mechanism. Then, finally, the glass sheet G placed on the inner mold 230 having a flapping mechanism is transferred onto the outer mold 240 having a flapping mechanism.

In the inner mold 230 having a flapping mechanism, as shown in FIG. 5, when the inner mold movable frames 239 flap in a state that the glass sheet G is placed, the glass sheet G is bent towards the inside, whereby the glass sheet G is preliminarily formed. Here, the inner mold fixed frame 237 and the inner mold movable frames 239 may be each constructed to be covered with a heat-resistant cloth or a heat-resistant unwoven cloth made of e.g. a stainless steel so as not to damage a glass sheet G placed thereon. Although the inner mold 230 having a flapping mechanism has been described in this example, the inner mold may be constituted only by a fixed frame having no flapping mechanism when the preliminary bent shape is in a degree that a glass sheet can be smoothly transferred onto the outer mold.

As shown in FIGS. 3 and 4, the outer mold 240 having a flapping mechanism has a ring-shaped construction constituted by an outer mold fixed frame 242 and outer mold movable frames 244 connected to respective ends of the outer mold fixed frame 242 via respective hinge portions 243.

The outer mold fixed frame 242 is fixed to the table 210 by a supporting frame 241. Meanwhile, the outer mold movable frames 244 are each connected with the movable rod 253 movable up and down by a servo motor, via a rod 255 connected to the outer mold movable frame 244 and a pressure-reception portion 255a. Accordingly, the outer mold movable frames 244 are each swung with respect to the outer mold fixed frame 242 about a hinge portion 243 according to up-down movement of the movable rod 253. This swing operation of the outer mold movable frames 244 is referred to as flapping.

Here, in this embodiment, a preliminary lower mold 220 is disposed further inside the inner mold 230 as shown in FIGS. 3 and 4. The preliminary lower mold 220 has a forming face opposed to the preliminary forming mold 302, and the forming face has a large number of holes perforating therethrough so that by sucking air through these holes by a pump (not shown), preliminary forming of the glass sheet G is further promoted. Further, the forming face of the preliminary lower mold 220 is covered with a heat-resistant cloth or a heat-resistant unwoven cloth made of e.g. a stainless steel.

Figure 12:
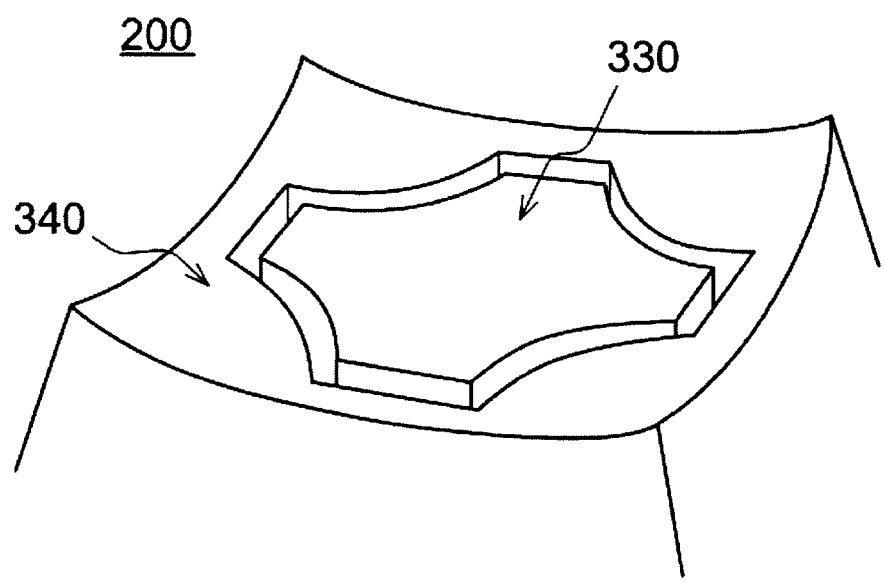
FIG. 12: A perspective view showing a lower forming apparatus 200 for preliminary forming of an embodiment different from that of FIG. 3.

Further, as shown in FIG. 12, the lower forming apparatus 200 for preliminary forming may be a preliminary forming supporting mold of a mold type that is integrally formed with a preliminary lower mold having an inner mold 330 and an outer mold 340 disposed around the inner mold 330. A glass sheet G is placed on the inner mold 330, and when the inner mold 330 moves down, the glass sheet G is transferred onto the outer mold 340. Forming faces of the inner mold 330 and the outer mold 340 are each covered with a heat-resistant cloth or a heat-resistant unwoven cloth made of e.g. a stainless steel.

The upper forming apparatus 300 for preliminary forming is attached to the ceiling of the forming furnace 20, and has a preliminary forming mold 302 to which a duct 304 is connected.

The preliminary forming mold 302 is a hollow mold made of a metal (cast metal), which has a face (hereinafter referred to as forming face) formed into a predetermined curved shape to contact with a glass sheet G. The forming face of the preliminary forming mold 302 has a large number of holes perforating therethrough, and by sucking air through the duct 304, air is sucked into the mold through these holes, whereby the glass sheet G after press-forming is held by the suction. Further, on the contrary, it is also possible to blow air through the duct. Here, the forming face of the preliminary forming mold 302 is covered with a heat-resistant cloth or a heat-resistant unwoven cloth made of e.g. a stainless steel.

Figure 10A:
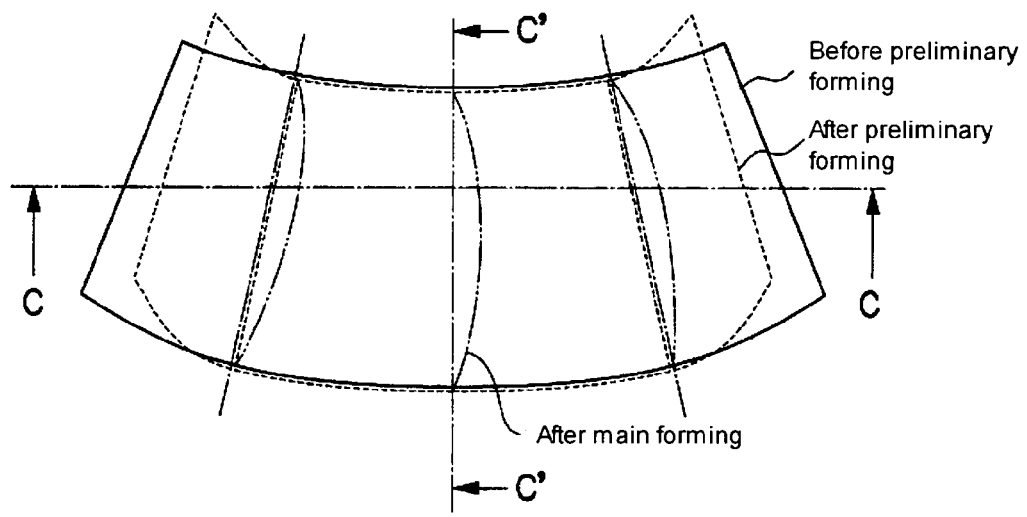
FIG. 10(a): A view for explaining shapes of a glass sheet before preliminary forming, after preliminary forming and after main forming (a deep-wing-shaped glass sheet), respectively.
Figure 10B:
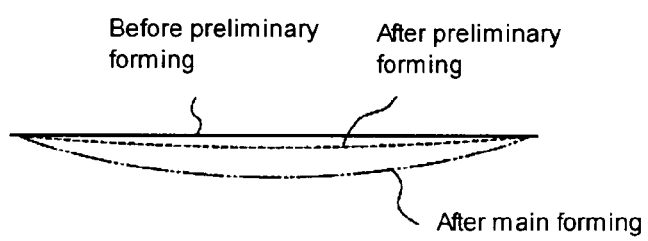
FIG. 10(b): A C'-C' cross sectional view of the glass sheet shown in FIG. 10(a).
Figure 10C:
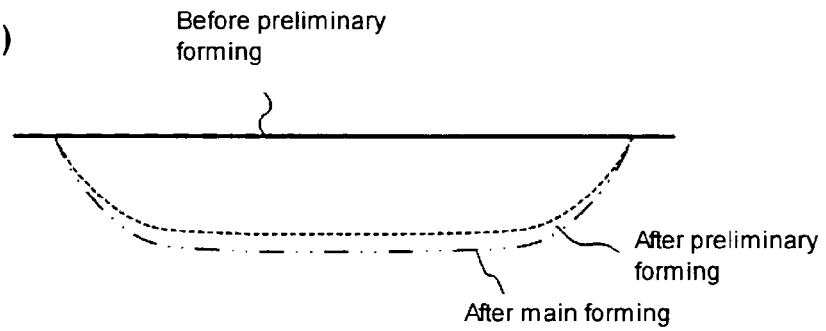
FIG. 10(c): A C-C cross sectional view of the glass sheet shown in FIG. 10(a).
Figure 11A:
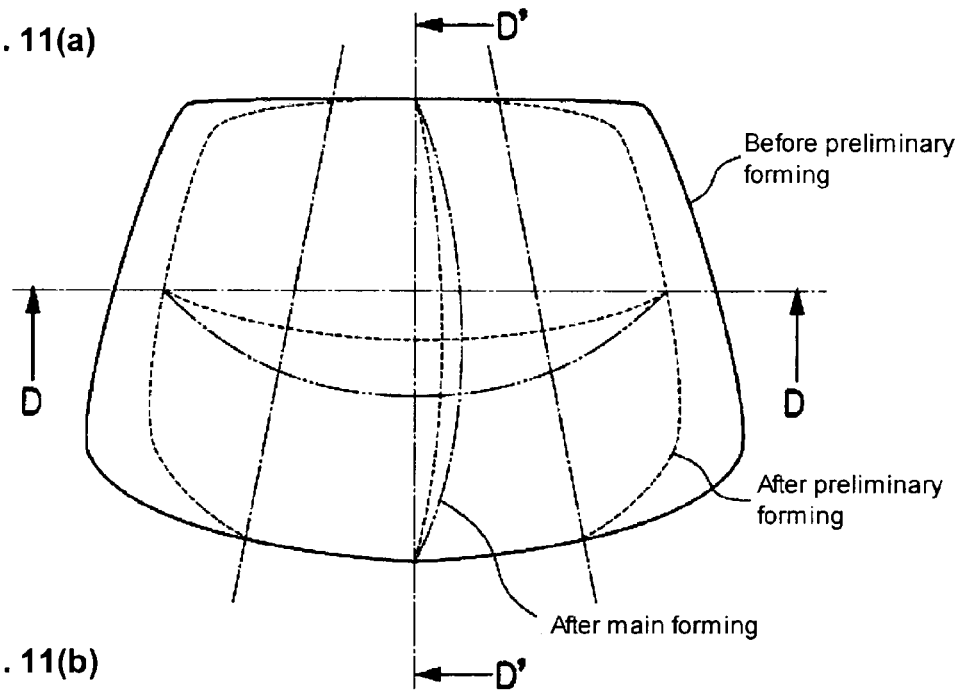
FIG. 11(a): A view for explaining shapes of a glass sheet before preliminary forming, after preliminary forming and after main forming (an egg-shaped glass sheet), respectively.
Figure 11B:
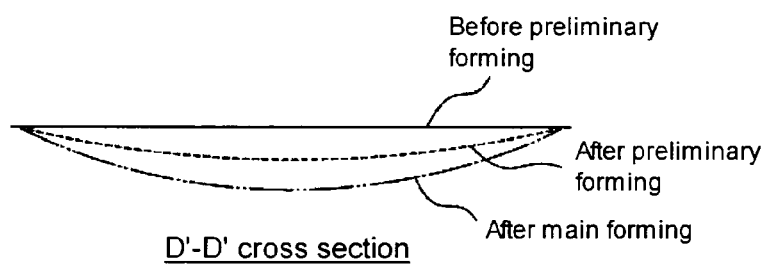
FIG. 11(b): A D'-D' cross sectional view of the glass sheet shown in FIG. 11(a).
Figure 11C:
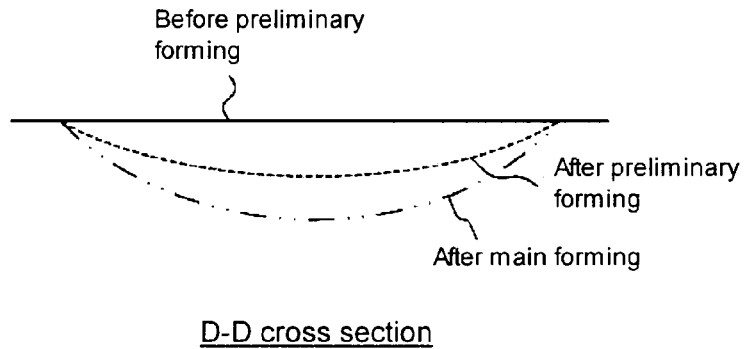
FIG. 11(c): A D-D cross sectional view of the glass sheet shown in FIG. 11(a).

By the preliminary forming apparatus 60, the glass sheet G is preliminary formed into a deeply bent shape so as to conform to a final shape to be formed. For example, as shown in FIGS. 10(a), 10(b) and 10(c), in a case of a glass sheet G having a final bent shape of so-called deep wing that is deeply curved in C-C direction and shallowly curved in C'-C' direction perpendicular to C-C direction, the outer mold 240 having a flapping mechanism bends the glass sheet G in C-C direction that is a direction in which the curvature is large, to preliminarily form the glass sheet into a shape approximately agrees with an outline of the final bent shape in plan view (outline of main forming supporting mold 540 in plan view). Likewise, for example, as shown in FIGS. 11(a), 11(b) and 11(c), in a case of a glass sheet G having a final bent shape of so-called egg shape that is deeply curved in D-D direction and shallowly curved in D'-D' direction perpendicular to D-D direction (the shallow curvature is larger than the curvature in the direction perpendicular to C-C direction shown in FIG. 10(a)), the outer mold 240 having a flapping mechanism bends the glass sheet G in D-D direction in which the curvature is large, to preliminarily form the glass sheet G into a shape approximately agrees with the outline of the final bent shape in plan view (outline of the main forming supporting mold 540 in plan view).

Thus, by preliminarily forming the glass sheet G so that the outline of the glass sheet G in plan view approximately agrees with the outline of final bent shape in plan view (outline of the main forming supporting mold 540 in plan view), the shape of the glass sheet G after preliminary forming becomes a shape that can be easily placed on the main forming supporting mold 540 with a proper posture. Accordingly, it is possible to suppress a position error of the glass sheet G after preliminary forming, placed on the main forming supporting mold 540. Here, the main forming supporting mold 540 and the outer mold 240 have approximately the same size, and for example, the outline of the main forming supporting mold 540 in plan view and the outline of the outer mold 240 in plan view have approximately the same size. As an alternative, at least two opposed sides of the outline of the outer mold 240 in plan view (for example, fixed frame 242, 242 in FIG. 4), approximately agree with at least two sides (not shown) corresponding to the opposed two sides of the outline of the outer mold 240 in plan view in the main forming supporting mold 540.

[Main Forming Apparatus 62]

As shown in FIGS. 1 and 2, the main forming apparatus 62 is an apparatus for carrying out a main forming to a glass sheet G preliminarily formed by the preliminary forming apparatus 60, and the main forming apparatus 62 has a lower forming apparatus 500 for main forming and an upper forming apparatus 600 for main forming.

The lower forming apparatus 500 for main forming has a main forming supporting mold 540 and a lower mold 520 disposed inside the main forming supporting mold 540.

The lower forming apparatus 500 for main forming is mounted on a table 510 having moving rollers 718 rolling on a rail 25 disposed under the floor, and the moving rollers 718 are each rotated by a servo motor (not shown), whereby the lower forming apparatus 500 for main forming moves by itself as it is guided by the rail 25.

Figure 8:
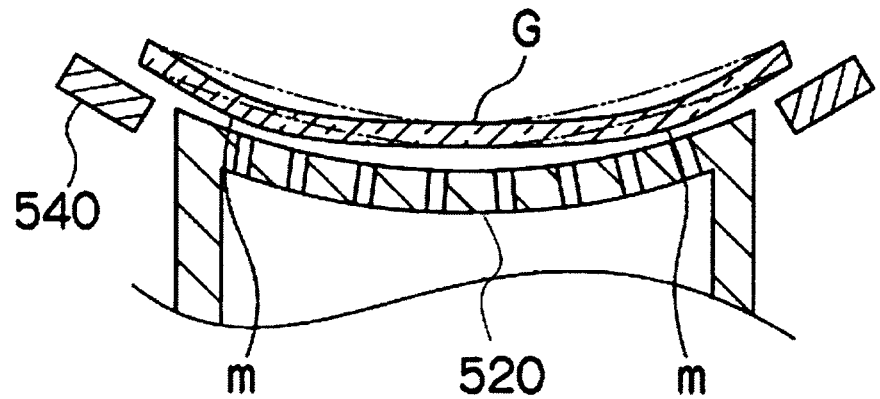
FIG. 8: A view for explaining the relation between a glass sheet after preliminary forming and a lower forming apparatus for main forming.

As shown in FIG. 8, the lower mold 520 is a hollow mold made of iron (cast iron), which has a face (hereinafter referred to as forming face) formed into a predetermined curved shape to contact with a glass sheet G. In this embodiment, the lower mold 520 and the main forming supporting mold 540 have shapes so that the final bent shape of the glass sheet G becomes a shape having curvatures at least in two directions (in FIG. 10, for example, two directions that are C-C direction and C'-C' direction perpendicular to C-C direction, and in FIG. 11, for example, two directions that are D-D direction and D'-D' direction perpendicular to D-D direction).

The forming face of the lower mold has many holes perforating therethrough, and by sucking air from these holes by a pump (not shown), it is possible to promote forming of the glass sheet G. Further, on the contrary, it is also possible to blow air from these holes by the pump. Here, the forming face of the lower mold 520 is covered with a heat-resistant cloth or a heat-resistant unwoven cloth made of e.g. a stainless steel.

Figure 13:
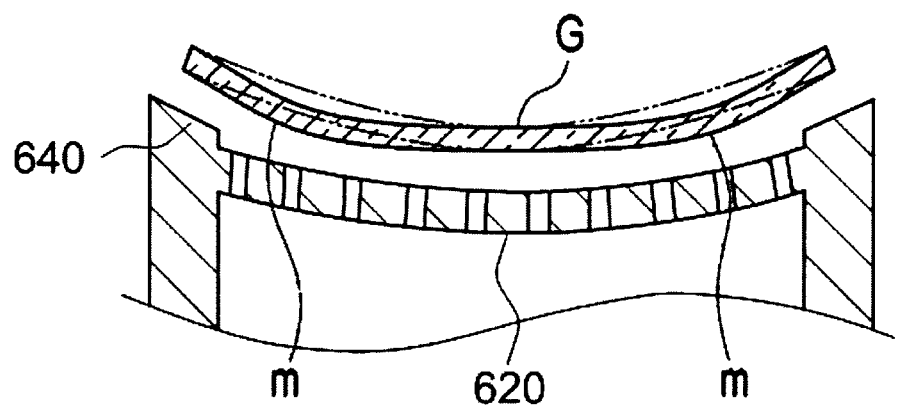
FIG. 13: A cross sectional view showing a lower forming apparatus for main forming of an embodiment different from that of FIG. 8.
Figure 14:
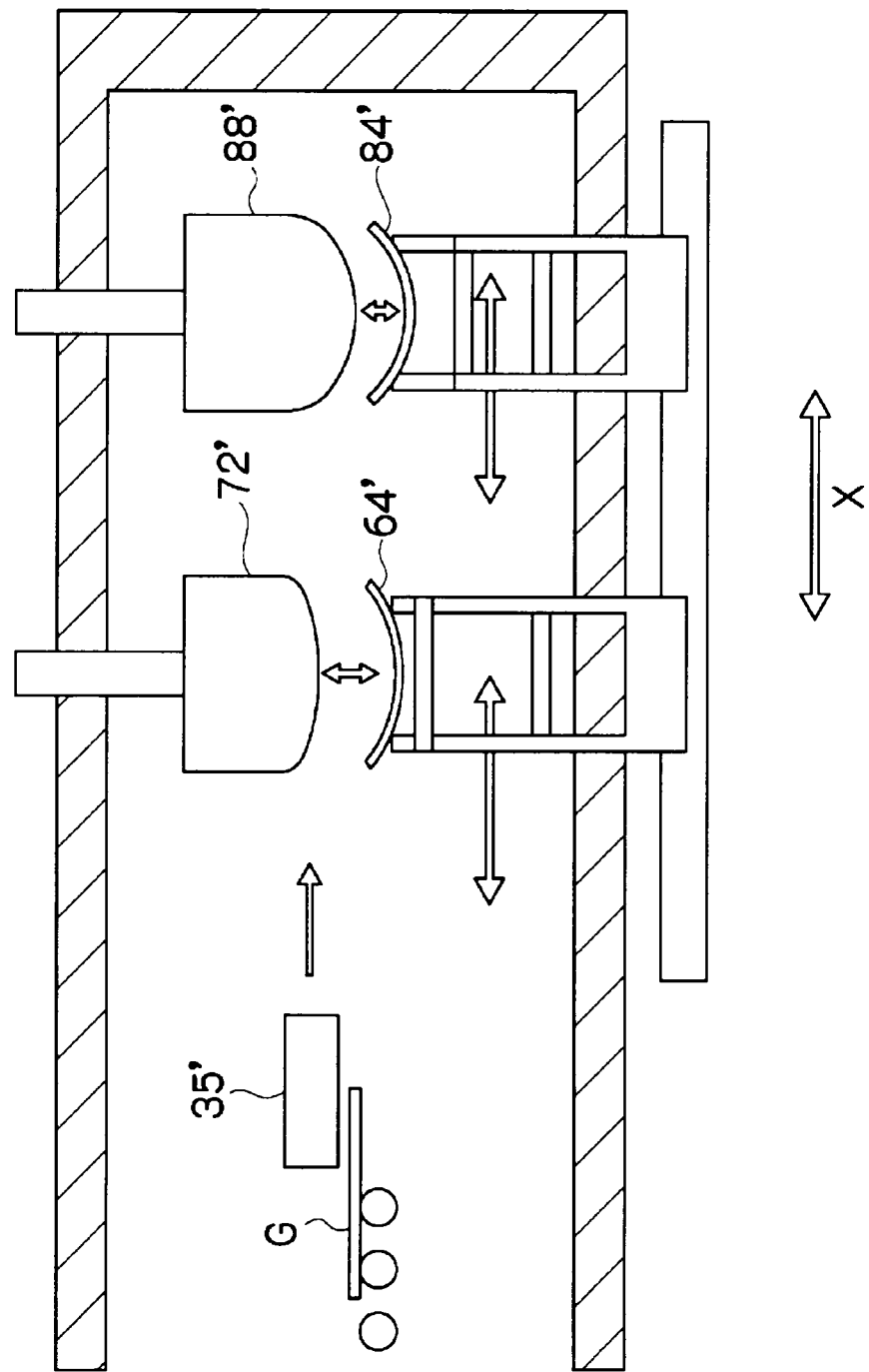
FIG. 14: A view for explaining a conventional bending apparatus for a glass sheet.

Further, as shown in FIG. 13, in the lower forming apparatus for main forming, the lower mold 620 and the main forming supporting mold 640 may be integrally formed. The lower mold 620 is provided with a main forming supporting mold 640 of a mold type functioning as a main forming supporting mold. Forming faces of the lower mold 620 and the main forming supporting mold 640 are each covered with a heat-resistant cloth or a heat-resistant unwoven cloth made of e.g. a stainless steel.

The main forming upper forming apparatus 600 is attached to a ceiling of the forming furnace 20, and the apparatus has a main forming mold 602 to which a duct 604 is connected. The main forming mold 602 is a hollow mold made of a metal (cast metal), which has a face (hereinafter referred to as forming face) formed into a predetermined curved shape to contact with a glass sheet G. The forming face of the main forming mold 602 has many holes perforating therethrough, and by sucking air through these holes via the duct 604, air is sucked into the mold through these holes, whereby a glass sheet G after press-forming is sucked and held. Further, on the contrary, it is also possible to blow air via the duct 604. Here, the forming face of the main forming mold 602 is covered with a heat-resistant cloth or a heat-resistant unwoven cloth made of e.g. a stainless steel.

[Operation of Bending Apparatus 100 for a Glass Sheet]

Next, the bending method for a glass sheet G in the bending apparatus 100 for a glass sheet having the above construction, will be described.

First, a flat mold 23 sucks and holds a heated and softened glass sheet G, moves to a predetermined position, and releases the suction-holding. By this operation, the heated and softened glass sheet G is transferred onto a flat inner mold 230 (an inner mold 230 having a flapping mechanism in a state that an inner mold fixed frame 237 and inner mold movable frames 239 are substantially flat) in the lower forming apparatus 200 for preliminary forming located at a predetermined position (refer to FIGS. 2 and 3).

Next, the lower forming apparatus 200 for preliminary forming on which a glass sheet G is placed, moves to a position right under the preliminary forming mold 302. While the movement, as shown in FIG. 5, the inner mold 230 is gradually lowered to approach to an outer mold 240 having a flapping mechanism. Then, finally, the glass sheet G placed on the inner mold 230 is transferred onto the outer mold 240 having a flapping mechanism. Namely, by lowering the base plate 235 and the inner mold fixed frame 237, the inner mold 230 having a flapping mechanism gradually approaches to the outer mold 240 having a flapping mechanism while the inner mold movable frames 239 flap the glass sheet placed on the inner mold 230 having a flapping mechanism. Then, finally, the glass sheet G placed on the inner mold 230 having a flapping mechanism is transferred onto the outer mold 240 having a flapping mechanism.

Thus, since the glass sheet G is gradually transferred from the inner mold 230 onto the outer mold 240 having a flapping mechanism, as compared with a case of directly placing the glass sheet G onto the outer mold 240 having a flapping mechanism, it is possible to easily position the glass sheet G on the outer mold 240 having a flapping mechanism. Namely, it becomes possible to place a flat glass sheet G on the outer mold 240 having a flapping mechanism with a proper posture while it is slightly bent by the inner mold 230. Accordingly, it is possible to suppress variation of glass forming accuracy. Further, since the glass sheet G is gradually transferred from the inner mold 230 onto the outer mold 240 having a flapping mechanism, as compared with a case of dropping a glass sheet G to directly place it on the outer mold 240 having a flapping mechanism, it is possible to prevent breakage of the glass sheet by a shock of the drop. Further, it is also possible to prevent formation of a hinge mark on the glass sheet G due to the flapping mechanism of the outer mold 240 having a flapping mechanism. Further, in this embodiment, since a preliminary lower mold 220 is disposed further inside the inner mold 230 and since the inner mold 230 is present, it is not possible to press a portion that tends to be excessively bent, but it is possible to press the central portion of the glass sheet from underside.

Figure 6:
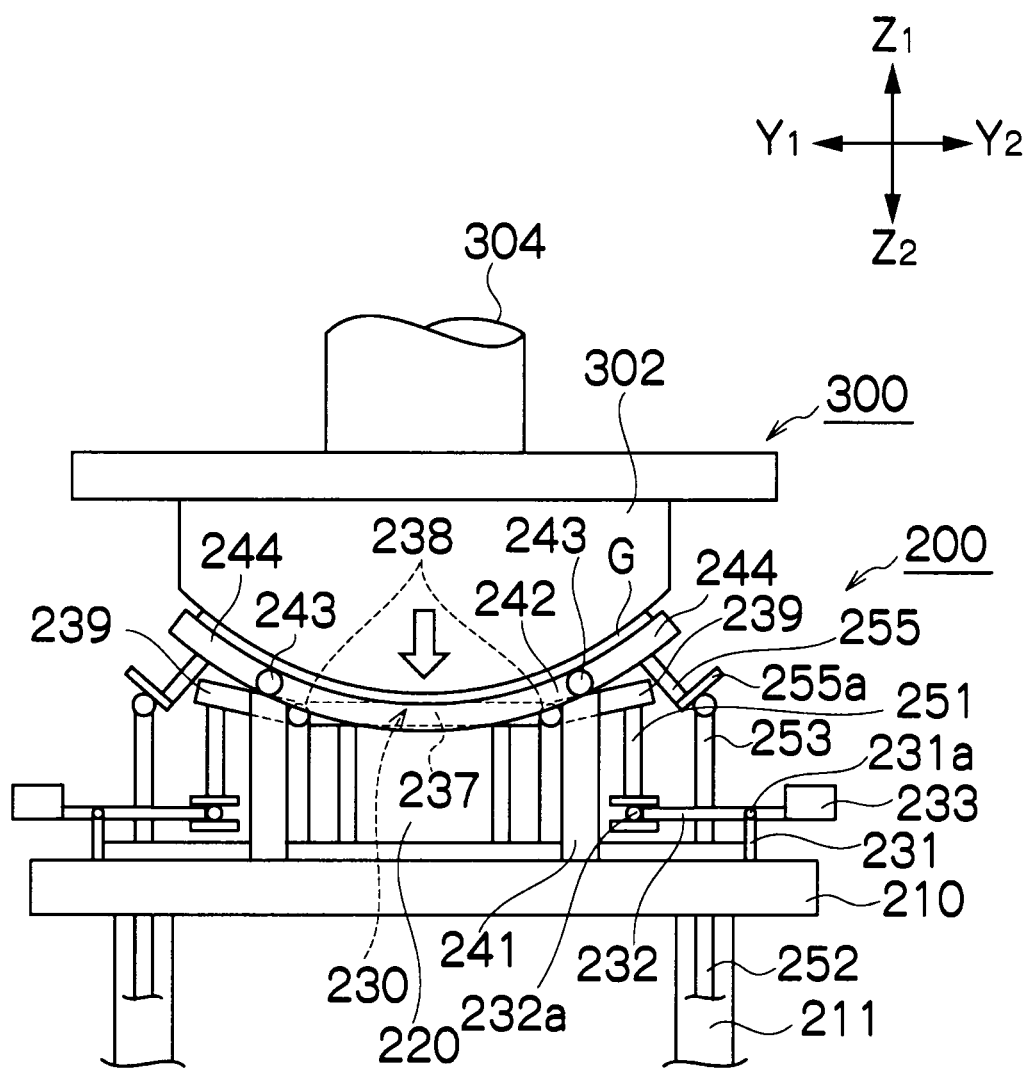
FIG. 6: A side view for explaining a press-forming by a preliminary forming mold.

Next, the glass sheet G placed on the outer mold 240 having a flapping mechanism is preliminarily formed by the outer mold 240 having a flapping mechanism and a preliminary forming mold 302 lowered by an up-down mechanism (not shown) while movable frames 244 of the outer mold 240 having a flapping mechanism flap as shown in FIG. 6. FIG. 6 shows a state that the glass sheet is pressed by the outer mold 240 having a flapping mechanism and the preliminary forming mold 302.

As shown in FIGS. 10(*a*), 10(*b*) and 10(*c*), in a case of a glass sheet G having a final bent shape of so-called deep wing which is deeply curved in C-C direction and shallowly curved in C'-C' direction perpendicular to C-C direction, the glass sheet G is bent in C-C direction having a large curvature in this preliminary forming, to be preliminarily formed into a shape approximately agrees with the outline of the final bent shape in plan view (outline of the main forming supporting mold 540 in plan view). Likewise, as shown in FIGS. 11(*a*), 11(*b*) and 11(*c*), in a case of a glass sheet G having a final bent shape of so-called egg which is deeply curved in D-D direction and shallowly curved in D'-D' direction perpendicular to D-D direction (however, the curvature in D'-D' direction is larger than that in C'-C' direction perpendicular to C-C direction shown in FIG. 10(*a*)), the glass sheet G is bent in D-D direction having a large curvature in this preliminary forming, and is preliminarily formed into a shape substantially agrees with the outline of the final bent shape in plan view (outline of the main forming supporting mold 540 in plan view). Here, in the case of the glass sheet G having the so-called egg shape, if the degree of the curvature of the final bent shape is shallow, the glass sheet G may be preliminarily formed by employing an inner mold 230 having no flapping mechanism (namely, the glass sheet G may be flapped only by the outer mold 240).

Figure 7A:
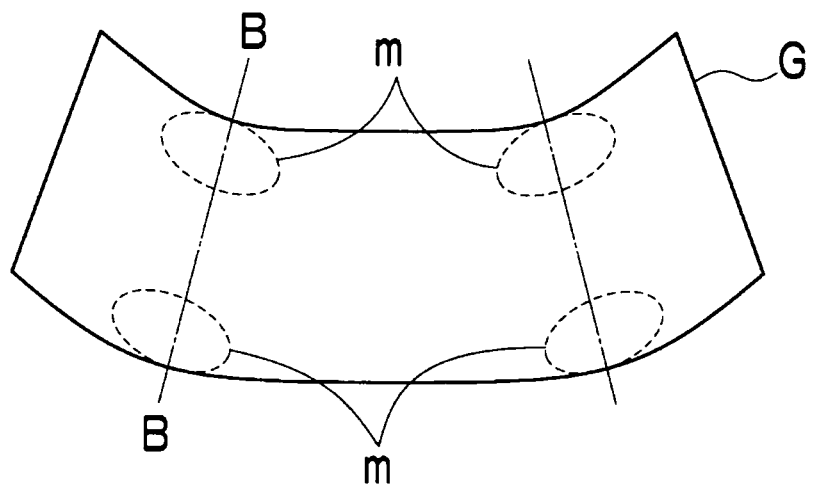
FIG. 7(a): A view for explaining a glass sheet having portions of undesired excessive bending by preliminary forming.
Figure 7B:
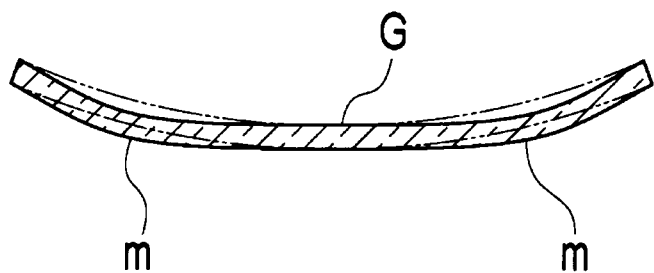
FIG. 7(b): A B-B cross sectional view of FIG. 7(a).

The outer mold 240 having a flapping mechanism and the preliminary forming mold 302 are each formed into a deeply curved shape corresponding to a finally formed shape. Accordingly, by the above preliminary forming, the glass sheet G is deeply bent but bulges m due to undesired excessive bent are formed or wrinkles are formed as shown in FIGS. 7(*a*) and 7(*b*). Namely, the bulges m which are circled by the dotted lines shown in FIG. 7(*a*), each has a deeply curved shape designated as a bulge m deviating from a desired shape indicated by the double dashed lines as understandable from FIG. 7(*b*) being a B-B cross sectional view of FIG. 7(*a*) containing the bulges m.

Next, by sucking air through the many holes perforating the forming face of the preliminary forming mold 302, the glass sheet G is sucked and held by the forming face, and while the movable frames 244 are opened outwardly, the upper forming apparatus 300 for preliminary forming and the lower forming apparatus 200 for preliminary forming are separated. Thereafter, the lower forming apparatus 200 for preliminary forming self-moves to a position right under the flat mold 23 to receive a glass sheet G, and the lower forming apparatus 500 for main forming self-moves to a position right under the upper forming apparatus 300 for preliminary forming.

Next, the preliminary forming mold 302 sucking and holding the preliminarily formed glass sheet G, approaches to the main forming supporting mold 540 of the lower forming apparatus 500 for main forming, and subsequently, the suction-holding is released. Accordingly, the preliminarily formed glass sheet G is dropped to be placed on the lower forming apparatus 500 for main forming (main forming supporting mold 540).

As described above, by preliminarily forming the glass sheet G so that the outline of the glass sheet G in plan view substantially agrees with the outline of the final bent shape in plan view (outline of the main forming supporting mold 540 in plan view), the glass sheet G after the preliminary forming has such a shape that the glass sheet G is easily placed on the main forming supporting mold 540 with a proper posture.

Accordingly, generation of position error of the glass sheet G after preliminary forming, placed on the main forming supporting mold 540, is suppressed.

The lower forming apparatus 500 for main forming having the main forming supporting mold 540 on which such a preliminary formed glass sheet G is placed, self-moves to a position right under an upper forming apparatus 600 for main forming. FIG. 8 is a view showing shapes of the main forming supporting mold 540, a lower mold 520 and the glass sheet G in main forming. In FIG. 8, they are depicted in a state that the lower mold 520 is separated from the glass sheet G for convenience of explanation. The forming face of the lower mold 520 has many holes perforating therethrough, and by sucking air through these holes by a pump (not shown), it is possible to suck the glass sheet during conveyance. By this construction, it is possible to further slowly and deeply bend the glass sheet while the lower forming apparatus 500 for main forming self-moves to the position right under the upper forming apparatus 600 for main forming.

Further, the above construction supports bulges m to prevent further bending of the glass sheet by its own weight. It is also possible to push the bulges back upwardly to meet the final bent shape.

Figure 9:
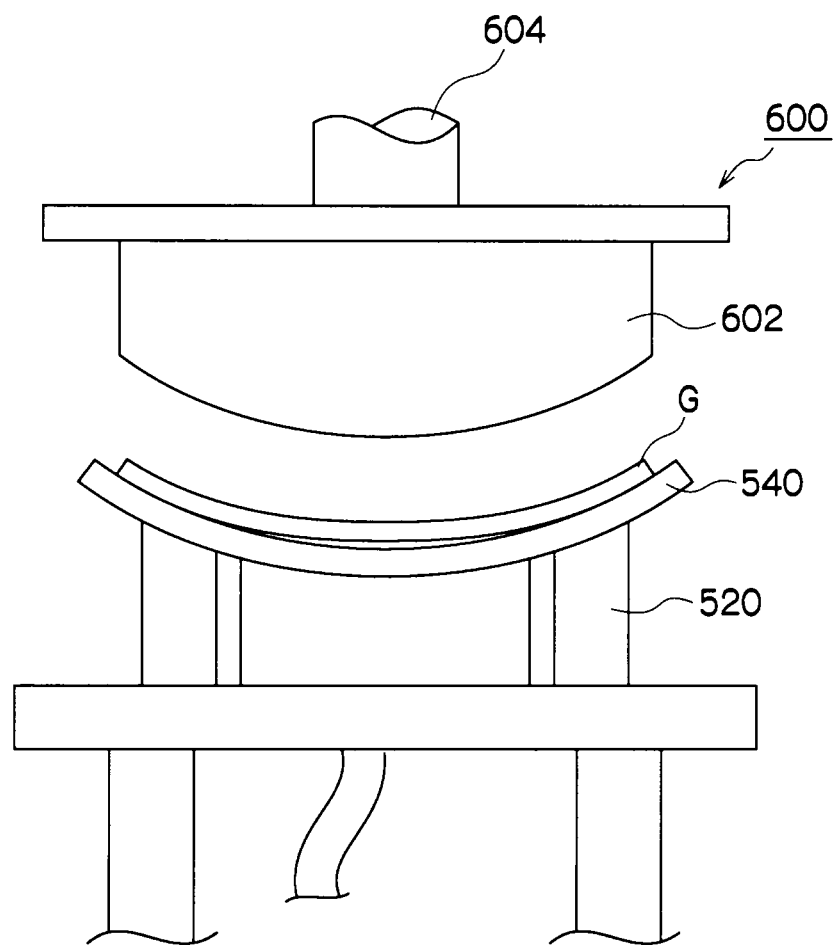
FIG. 9: A view for explaining press-forming by a main forming mold.

In the main forming apparatus 62, a glass sheet G placed on a main forming supporting mold 540 is pressed against a main forming mold 602 to carry out main forming (press-forming) while an undersurface of the glass sheet G is supported by the forming face of the lower mold 520. FIG. 9 is a view showing a glass sheet G just before the press placed on the main forming supporting mold 540, and the main forming mold 302. The glass sheet G is in a state of cross sectional condition after preliminary forming shown in FIG. 10(b) or in a state of cross sectional condition after preliminary forming shown in FIG. 11(b), and thereafter, the upper face of the glass sheet G is pressed against the main forming mold 602 to be main-formed (press-formed).

In a state that the glass sheet is pressed against a main forming mold 602, suction of air through the holes of the lower mold 520 is stopped and blowing of air is started, whereby the glass sheet is separated from the lower mold 520 and is pressed against the main forming mold 602.

By this operation, it becomes possible to eliminate bulges m or wrinkles formed by a deep bending at the time of preliminary forming. Further, the lower mold 520 prevents generation of portions bent more deeply than desired curves or formation of wrinkles in the main forming.

As described above, since the bending apparatus 100 for a glass sheet of this embodiment employs a preliminary forming supporting mold having an inner mold 230 and an outer mold 240 having a flapping mechanism and disposed around the inner mold 230, it is possible to easily position the glass sheet on the outer mold 240 having a flapping mechanism, and to prevent damage of the glass sheet due to dropping of the glass sheet and a hinge mark on the glass sheet G due to the flapping mechanism of the outer mold 240 having a flapping mechanism. Further, since a lower mold 520 disposed inside the main forming supporting mold 540 is employed, it is possible to press the bulges m formed at the time of preliminary forming by the lower mold 520 to eliminate the bulges. Further, it is possible to suppress swelling of the glass sheet G in the second-stage press (main forming).

The above embodiment is merely an example by all means. The present invention should not be construed as limited by these descriptions. The present invention can be carried out in other various forms without departing from the concept or main features of the present invention. For example, between the preliminary forming lower forming apparatus and the preliminary forming mold, or between the main forming lower forming apparatus and the main forming mold, it is sufficient that one is configured to move up and down relatively to the other to press-form a glass sheet.

INDUSTRIAL APPLICABILITY

The present invention is suitable for bending a glass sheet into a complex shape or a deeply curved shape, and is usable for productions of automobile glasses, vehicle glasses and industrial glasses having such shapes.

The entire disclosure of Japanese Patent Application No. 2007-313558 filed on Dec. 4, 2007 including specification, claims, drawings and summary is incorporated herein by reference in its entirety.

What is claimed is:

1. A method for bending a glass sheet, comprising:
a preliminary forming step which comprises placing a softened glass sheet on a plate preliminary forming supporting mold which supports edge portions of the glass sheet, and pressing the glass sheet against a forming face of the preliminary forming supporting mold to bend the glass sheet in a preliminary bent shape while the glass sheet is placed on the preliminary forming supporting mold; and
a main forming step which comprises transferring the glass sheet in the preliminary bent shape onto a main forming supporting mold which supports edge portions of the glass sheet, and pressing the glass sheet against a forming face of a main forming mold to bend the glass in a final bent shape while the edge portions of the glass sheet are placed on the main forming supporting mold,
wherein the preliminary forming supporting mold comprises an outer mold and an inner mold provided inside the outer mold, the inner mold has a flatter glass-plate-placing face than a glass-plate-face of the outer mold,
the main forming supporting mold comprises a lower mold provided inside the main forming supporting mold, the lower mold has a forming face opposed to the main forming mold, the forming face of the lower mold and the main forming supporting mold have shapes curved in two directions such that the final bent shape of the glass sheet has curvatures at least in the two directions,
the preliminary forming step includes transferring the softened glass sheet onto the inner mold, transferring the glass sheet on the inner mold to the outer mold, pressing the glass sheet placed on the outer mold against the forming face of the preliminary forming mold, and
holding the glass sheet in the preliminary bent shape by the preliminary forming mold,
the main forming step includes transferring the glass sheet in the preliminary bent shape onto the main forming supporting mold, and pressing the glass sheet against the forming face of the main forming mold while an under surface of the glass sheet is supported by the forming face of the lower mold while the edge portions of the glass sheet are placed on the main forming supporting mold,
the outer mold of the preliminary forming supporting mold has a flapping mechanism comprising a fixed frame and at least one movable frame connected to respective ends of the fixed frame to be swingable, and the preliminary forming step includes flapping the glass sheet placed on the outer mold by the at least one movable frame, and
the flapping of the glass sheet by the at least one movable frame is commenced by lowering the inner mold toward the outer mold while a lower forming apparatus for preliminary forming is moving, wherein the inner mold of the preliminary forming supporting mold has a flapping mechanism comprising a fixed frame and at least one movable frame connected to respective ends of the fixed frame to be swingable, and the preliminary forming step includes flapping the glass sheet placed on the inner mold by the at least one movable frame of the inner mold.

2. The method according to claim 1, wherein the final bent shape has curvatures in at least the two directions, and the preliminary forming step comprises bending the glass sheet at least in a direction having a larger curvature in the final bent shape, to preliminarily bend the glass sheet in the preliminary bent shape.

3. The method according to claim 1, wherein the preliminary forming step comprises bending the glass sheet into a shape that substantially agrees with an outline of the final bent shape in a plan view, to preliminarily bend the glass sheet in the preliminary bent shape.

4. The method according to claim 1, wherein the forming face of the lower mold has a plurality of holes communicated with an air suction device, and the main forming step includes promoting forming of the glass sheet by suction of air through the plurality of holes by the air suction device.

5. The method according to claim 1, wherein the main forming step is performed inside a furnace.

6. The method according to claim 1, wherein the inner mold is smaller than the glass sheet before bending such that the inner mold supports the glass sheet at portions inside a periphery of the glass sheet.

7. An apparatus for bending a glass sheet, comprising:
a preliminary forming supporting mold configured to support edges of a softened glass sheet;
a preliminary forming mold configured to press-mold the glass sheet placed on the preliminary forming supporting mold into a desired preliminary bent shape;
a main forming supporting mold for supporting configured to support edges of the glass sheet formed into in the preliminary bent shape; and
a main forming mold configured to press-form the glass sheet placed on the main forming supporting mold into a desired final bent shape,
wherein the preliminary forming supporting mold has an outer mold and an inner mold disposed inside the outer mold, the inner mold has a flatter glass-placing face than a glass-placing face of the outer mold, the preliminary forming supporting mold has a transferring device configured to transfer the glass sheet on the inner mold onto the outer mold,
the main forming supporting mold has a lower mold provided inside the main forming supporting mold, the lower mold has a forming face opposed to the main forming mold such that an under surface of the glass sheet is supported by the forming face of the lower mold,
the forming face of the lower mold and the main forming supporting mold have shapes curved in two directions such that the final bent shape of the glass sheet has curvatures at least in the two directions,
the outer mold of the preliminary forming supporting mold has a flapping mechanism comprising a fixed frame and at least one movable frame connected to respective ends of the fixed frame to be swingable, and
the inner mold and the outer mold are configured such that flapping of the glass sheet by the at least one movable frame is commenced by lowering the inner mold toward the outer mold while a lower forming apparatus for preliminary forming is moving,
wherein the inner mold of the preliminary forming supporting mold has a flapping mechanism comprising a fixed frame and at least one movable frame connected to respective ends of the fixed frame to be swingable.

8. The apparatus according to claim 7, wherein the main forming supporting mold has a shape that substantially agrees with a peripheral shape of the final bent shape having curvatures in at least two directions, and at least two opposing sides of an outline of the outer mold of the preliminary forming supporting mold in a plan view substantially agree with at least two opposing sides of an outline of the main forming supporting mold in a plan view corresponding to the opposing two sides of the outline of the outer mold of the preliminary forming supporting mold.

9. The apparatus according to claim 7, wherein an outline of the outer mold of the preliminary forming supporting mold in a plan view substantially agrees with an outline of the main forming supporting mold in a plan view.

10. The apparatus according to claim 7, wherein the lower mold has an air-suction device and the forming face having a plurality of holes communicated with the air-suction device.

11. The apparatus according to claim 7, wherein the main forming supporting mold comprises the lower mold and a supporting frame, and the supporting frame is separated from the lower mold.

12. The apparatus according to claim 7, wherein the main forming supporting mold comprises the lower mold and a supporting frame, and the supporting frame is integrally formed with the lower mold.

13. The apparatus according to claim 7, wherein the inner mold is smaller than the glass sheet before bending such that the inner mold supports the glass sheet at portions inside a periphery of the glass sheet.

* * * * *